United States Patent
Naono et al.

(10) Patent No.: US 7,739,083 B2
(45) Date of Patent: Jun. 15, 2010

(54) PROGRAM AND/OR METHOD FOR CALCULATING TUNING PARAMETERS FOR NUMERICAL COMPUTATION LIBRARY

(75) Inventors: Ken Naono, Tachikawa (JP); Masashi Egi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 490 days.

(21) Appl. No.: 11/480,393

(22) Filed: Jul. 5, 2006

(65) Prior Publication Data
US 2007/0021849 A1  Jan. 25, 2007

(30) Foreign Application Priority Data
Jul. 22, 2005 (JP) .............................. 2005-212469

(51) Int. Cl.
*G06F 17/10* (2006.01)
(52) U.S. Cl. .............................. 703/2; 703/22; 318/561
(58) Field of Classification Search ...................... 703/2, 703/6, 22; 318/561
See application file for complete search history.

(56) References Cited

U.S. PATENT DOCUMENTS

| | | | |
|---|---|---|---|
| 6,253,113 B1 * | 6/2001 | Lu | 700/28 |
| 7,079,145 B2 * | 7/2006 | Tonge et al. | 345/473 |
| 7,191,130 B1 * | 3/2007 | Leggetter et al. | 704/254 |
| 2005/0096950 A1 * | 5/2005 | Caplan et al. | 705/7 |

FOREIGN PATENT DOCUMENTS

| | | |
|---|---|---|
| JP | 2004-178372 | 6/2004 |
| JP | 2006-031605 | 2/2006 |

* cited by examiner

*Primary Examiner*—Kamini S Shah
*Assistant Examiner*—Herng-Der Day
(74) *Attorney, Agent, or Firm*—Mattingly & Malur, P.C.

(57) ABSTRACT

When a parameter for a numerical computation library is required, an optimum parameter reflecting a user policy is provided. A program calculates, based on a preset objective function, an optimum tuning parameter for executing a numerical computation library. The program reads the numerical computation library; reads the objective function; sets a user policy regarding speed performance and computational accuracy of the numerical computation library as plural policy parameters; reads, from preset execution histories of numerical computation libraries, execution histories of the numerical computation library; calculates, in a domain where the policy parameters are met and based on the execution histories having been read in, a tuning parameter for the numerical computation library by using the objective function; and outputs a calculation result of the objective function.

10 Claims, 13 Drawing Sheets

FIG. 6

EXAMPLE PROGRAM (WITH PARAMETER VALUES INPUTTED)　—60

$ POLICY TIME_BEST = 10 sec
$ POLICY TIME_WORST = 40 sec
$ POLICY ERROR_BEST = 10^-9
$ POLICY ERROR_WORST = 10^-5
$ POLICY SELECTION = MODEL
$ POLICY MODEL = min (TIME/TIME_BEST+ERROR/ERROR_BEST)　—52

CALL SOLVER (A, N, V, NV, E, TUNE)

- LIBRARY NAME (601)
- MATRIX NAME
- MATRIX SIZE
- EIGENVECTOR
- NUMBER OF EIGENVECTORS
- EIGENVALUE
- TUNING PARAMETER (603)

FIG. 7

| 411 | 412 | 413 | 414 | 415 | 416 | 417 | 418 | 419 |
|---|---|---|---|---|---|---|---|---|
| EXECUTION ID | DATE AND TIME | LIBRARY NAME | DIMENSION N | NUMBER OF EIGENVALUES NE | NUMBER OF EIGENVECTORS NV | TUNING PARAMETER TUNE | EXECUTION TIME (sec) | COMPUTATIONAL ERROR (ortho) |
| DL2021 | 2005/0429 10:01:21 | SOLVER | 10000 | 1000 | 1000 | 1.0E-5 | 14.3 | 3.201E-5 |
| DL2022 | 2005/0429 11:23:11 | SOLVER | 10000 | 1000 | 1000 | 1.0E-6 | 23.5 | 3.201E-6 |
| DL2023 | 2005/0429 12:03:06 | SOLVER | 10000 | 1000 | 1000 | 1.0E-7 | 28.5 | 3.201E-7 |
| HL2011 | 2005/0429 12:05:31 | SOLVER | 10000 | 1000 | 1000 | 1.0E-8 | 34.7 | 7.216E-8 |
| HL2012 | 2005/0429 12:19:29 | SOLVER | 20000 | 1000 | 1000 | 1.0E-10 | 201.7 | 2.014E-8 |
| DL2024 | 2005/0429 12:20:01 | SOLVER | 20000 | 1000 | 1000 | 1.0E-11 | 349.2 | 7.056E-9 |
| DL2025 | 2005/0429 12:30:49 | SOLVER | 20000 | 1000 | 1000 | 1.0E-12 | 729.2 | 1.201E-9 |
| DL2026 | 2005/0429 18:20:11 | SOLVER | 20000 | 1000 | 1000 | 1.0E-8 | 103.9 | 3.201E-5 |

PROGRAM AND/OR METHOD FOR CALCULATING TUNING PARAMETERS FOR NUMERICAL COMPUTATION LIBRARY

CLAIM OF PRIORITY

The present application claims priority from Japanese application JP 2005-212469 filed on Jul. 22, 2005, the content of which is hereby incorporated by reference into this application.

BACKGROUND OF THE INVENTION

The present invention relates to automatically setting parameters for numerical computation software, and more particularly, to automatically setting parameters reflecting a user policy when using a numerical computation library.

Using a computer to perform numerical computation for mathematical programming, multivariable analysis, or statistical analysis enables sophisticated simulation. Using a numerical computation library such as a solver is a known approach for such numerical computation. In such an approach, parameters for a numerical computation library are selected and tuned to execute numerical computation meeting a user's purpose.

In a process of performing numerical computation, selecting parameters for a numerical model and tuning them may cause plural parameters to affect each other and lead to widely varying computation results depending on parameter settings. There are, however, many cases in which a user cannot afford to appropriately set all parameters manually. Hence, there have been known methods for automatically setting parameters (see JP-A No. 2004-178372, for example).

In the method described in JP-A No. 2004-178372, an evaluation function for evaluating setup parameters is set and used to obtain optimum setup parameters.

SUMMARY OF THE INVENTION

In the conventional method mentioned above, however, while parameters for a numerical model can be set appropriately, it is not possible to reflect a user policy, which represents user's requirements, on multiple parameters being set.

Generally, in numerical computation performed for simulation as mentioned above, where a same numerical model and same data are used, setting higher computational accuracy results in a longer computation time, and setting lower computational accuracy results in a shorter computation time.

In the conventional method of automatically setting parameters, it is possible to keep numerical computation accuracy at a certain level. However, user requirements for numerical computation vary depending on the case. There may be cases in which a user wants to quickly obtain an approximate computation result. In other cases, the user may want to obtain a computation result with a desired accuracy regardless of the time required for the computation. Thus, a user policy for numerical computation may change every time computation is made.

The conventional method of automatically setting parameters, while allowing numerical computation accuracy to be kept at a certain level, does not make it possible to reflect a user policy varying from computation to computation to be reflected upon parameter settings.

The present invention has been made in view of the above circumstances. Accordingly, it is an object of the present invention to make optimum parameters reflecting a user policy available to the user when setting parameters for numerical computation.

The present invention provides a program which calculates, based on a preset objective function, an optimum tuning parameter for executing a numerical computation library. The program reads the numerical computation library; reads the objective function; sets a user policy regarding speed performance and computational accuracy of the numerical computation library as plural policy parameters; reads, from preset execution histories of numerical computation libraries, execution histories of the numerical computation library; calculates, in a domain where the policy parameters are met and based on the execution histories having been read, a tuning parameter for the numerical computation library by using the objective function; and outputs a calculation result of the objective function.

The present invention can therefore make it possible to obtain, when executing a numerical computation library, an optimum tuning parameter within a domain where a user policy is met. Using such a tuning parameter in executing a numerical computation library makes it possible to obtain computation results accurately reflecting a user policy (requirement) which changes every time computation is made.

BRIEF DESCRIPTION OF THE DRAWINGS

FIG. 6 is a screen image showing an example input screen on which execution conditions and a tuning parameter have been entered;

FIG. 7 is a table showing result data composition in a result database;

DESCRIPTION OF THE PREFERRED EMBODIMENTS

In the following, an embodiment of the present invention will be described with reference to the accompanying drawings.

Figure 1:
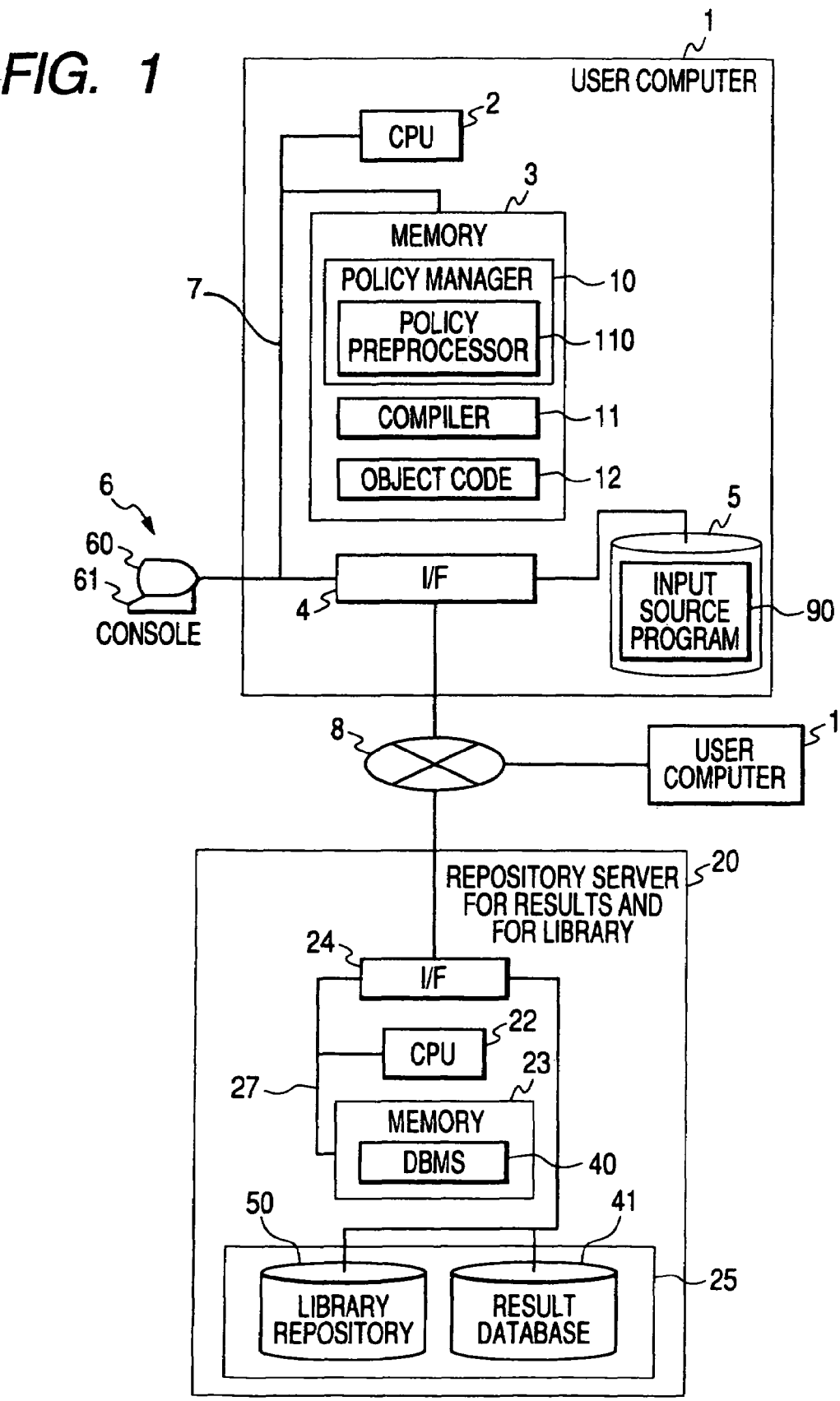
FIG. 1 is a block diagram of a computer system according to a first embodiment of the present invention.

FIG. 1 is a block diagram of a computer system according to a first embodiment of the present invention.

A user computer 1 for use by a user of a numerical computation library is connected, via an internal bus 7, with a CPU 2 which performs arithmetic processing, a memory 3 which temporarily stores programs and data, and an interface (I/F) 4 which exchanges information with external peripheral devices. The I\F 4 is connected with a storage device 5 which stores programs and data, a console 6 (display 60 and input device 61) which displays information to be viewed by a user or receives input from a user, and a network 8 for connection with an external computer.

The network 8 is connected with a library repository 50 storing plural numerical computation programs (functions) and objective functions and a repository server for results and for library 20 which, as being described later, manages a result database 41 storing results of past executions of numerical computation libraries (execution histories). The network 8 thus allows the library repository 50 and the repository server for results and for library 20 to be accessed from the user computer 1. Another user computer 1 for use by another user is also connected to the network 8. Like in the case of the above user computer 1, it is possible to access the repository server for results and for library 20 also from another user computer 1.

The repository server for results and for library 20 is connected, via an internal bus 27, with a CPU 22 which performs arithmetic processing, a memory 23 which temporarily stores programs and data, and an interface (I/F) 24 which exchanges information with external peripheral devices. The I\F 24 is connected with a storage device 25 which stores programs and data and the network 8 for connection with an external computer.

The storage device 25 stores the library repository 50 storing plural functions of numerical computation software (numerical computation libraries) and an objective function corresponding to each of the numerical computation libraries, and the result database 41 storing data on results of executing numerical computation software. The library repository 50 can be accessed from an external computer using an operating system (not shown) of the repository server for results and for library 20. A database management program (hereinafter referred to as the "DBMS") 40 loaded in the memory 23 allows the result database 41 to be accessed for use by an external computer.

A numerical computation library selected by a user and the objective function corresponding to the numerical computation library are read into the memory 3 of the user computer 1 from the repository server for results and for library 20. The execution conditions (input parameters) for the numerical computation library and a user policy composed of policy parameters are then received, and a policy manager 10 which specifies an optimum tuning parameter TUNE (being described later) meeting the user policy is executed.

The policy manager 10 is configured with a policy preprocessor 110 at its center. As being described later, the policy preprocessor 110 reads, from the result database 41, the result data corresponding to the numerical computation library read into the memory 3, and calculates, based on the corresponding objective function, a tuning parameter (execution parameter) TUNE meeting the user policy. The policy manager 10 reads a numerical computation software library specified by the user, generates a source program 90 based on execution conditions set by the user, and delivers the source program 90 to a compiler 11.

The compiler 11 for generating an object (object code) 12 from the source program 90 (source code), generated by the policy manager 10, of the numerical computation library has been loaded into the memory 3 and is ready for execution.

When the compiler 11 completes generation of the object 12, the policy manager 10 can deliver an optimum tuning parameter TUNE determined by the policy preprocessor 110 or a tuning parameter TUNE selected by the user to the object 12 so as to execute the object 12.

A plurality of the user computers 1 are connected to the network 8, and each of them can access and use the repository server for results and for library 20.

<Outline of Processing>

Figure 2:
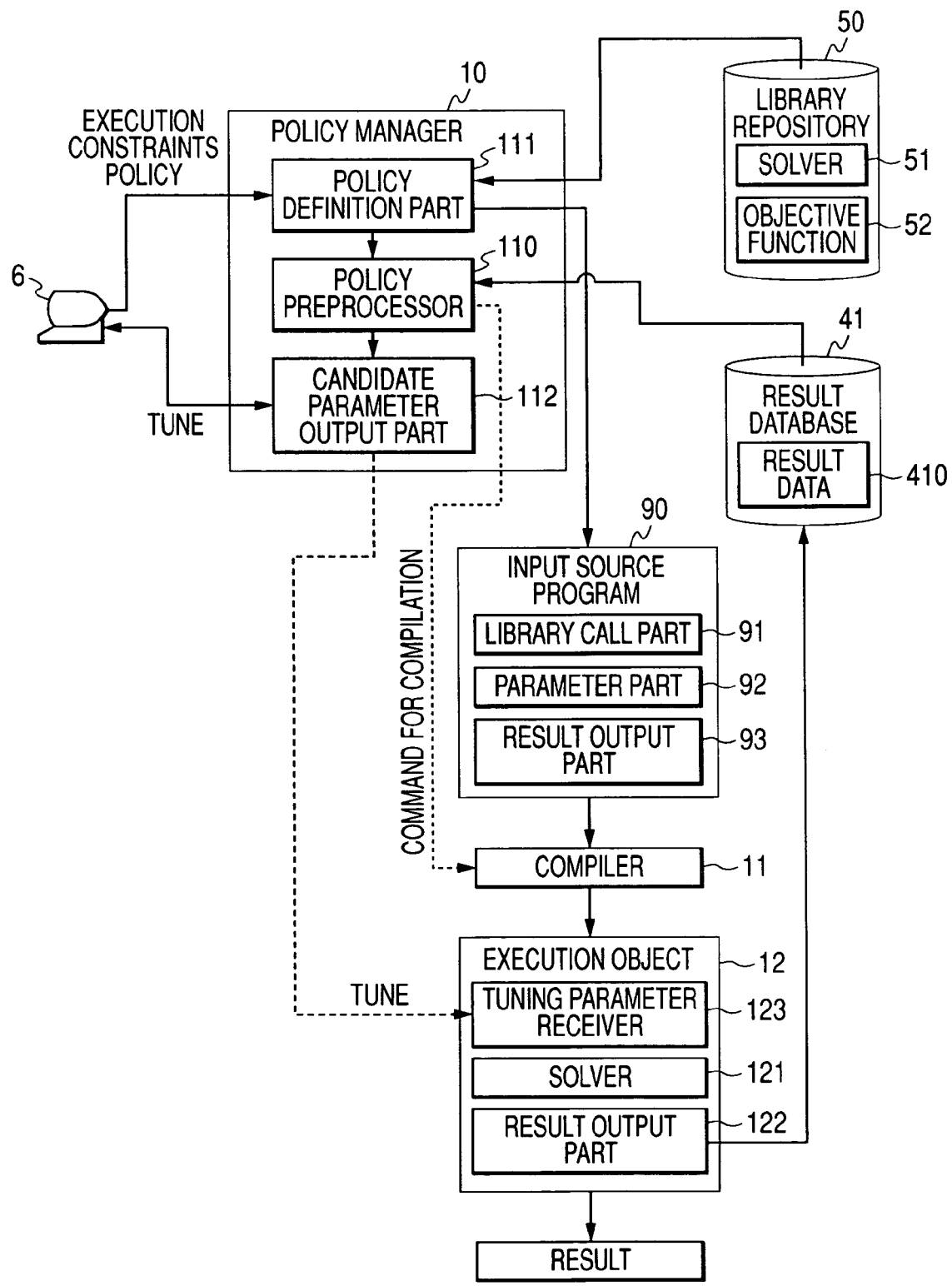
FIG. 2 is a block diagram showing a software configuration centering around a policy manager.

FIG. 2 is a block diagram illustrating a configuration of the policy manager 10 according to the present invention and an overall flow of processing performed in the computer system shown in FIG. 1.

The policy manager 10 of the present embodiment has the following three functions.

A first of the three functions is to receive, for a numerical computation library specified by a user, a user policy and execution conditions, and outputs an optimum execution parameter (tuning parameter TUNE). The tuning parameter TUNE determines, when executing the selected library, the values of two mutually opposing conditions (for example, computation time and computational accuracy) based on the user policy. An executable form (object 12) of the selected library realizes the user policy (computation time and computational accuracy) by controlling computation based on the tuning parameter TUNE.

In the present embodiment, the library repository 50 stores solvers 51 as libraries, and the tuning parameter TUNE sets an accuracy of ending repetitive computation for an eigenvalue e of a solver 51. Namely, in the operation being described in the following, the tuning parameter TUNE serves as a computational accuracy limiting value applied to numerical computation.

It is possible to change the tuning parameter TUNE as required according to the nature of the solver 51 to be used. The tuning parameter TUNE may be, for example, a reference value for ending repetitious calculation of an eigenvalue e, or a reference value for a computational error of an eigenvector V or for the number of times of repeating calculation of the eigenvector V. The tuning parameter TUNE is preferably an item included in result data 410, being described later, stored in the result database 41.

A second of the three functions is to generate the source program 90 including the numerical computation library specified by the user, delivers the source program 90 to the compiler 11, and obtains the object 12.

A third of the three functions is to deliver the tuning parameter TUNE outputted as mentioned above and selected by the user to the object 12 and have the object 12 executed to realize numerical computation meeting the user policy.

To realize the above three functions, the policy manager 10 is, as shown in FIG. 2, provided with a policy definition part 111, the policy preprocessor 110, and a candidate parameter output part 112. The policy definition part 111 receives a numerical computation library and execution conditions selected by the user, policy parameters representing a user policy and a tuning parameter TUNE specified by the user, and generates the source program 90. The policy preprocessor 110 calculates an optimum tuning parameter TUNE based on the result data 410 corresponding to the numerical computation library selected by the user and a preset objective function 52. The candidate parameter output part 112 outputs the tuning parameter TUNE calculated by the policy preprocessor 110 to the console 6, accepts a selection by the user, and provides the object 12 with the selected tuning parameter TUNE.

According to the present first embodiment, the source program 90 generated by the policy definition part 111 activates the compiler 11 in accordance with a command from the policy preprocessor 110, causing the generation by the compiler 11 of the object 12 and the calculation of an optimum tuning parameter TUNE to take place concurrently in the user computer 1.

When, as a result of calculations made by the policy preprocessor 110, plural tuning parameters TUNE are obtained, the candidate parameter output part 112 outputs the plural tuning parameters TUNE to the console 6 and the user selects one of them. When ordered by the user, the policy manager 10 executes the object 12 using the selected tuning parameter TUNE as an execution parameter, so that computation complying with the user policy can be made.

An alternative arrangement may be made such that when, after a tuning parameter TUNE is selected, the object 12 is generated by the compiler 11, the candidate parameter output part 112 provides the tuning parameter TUNE, and the object 12 is executed. In this case, the user can have the tuning parameter TUNE set and the object 12 executed automatically just by inputting the tuning parameter TUNE.

When the execution of the object 12 completes, computation results are outputted. At the same time, the object 12 writes execution results (for example, execution histories comprising speed performance and computational accuracy data based on execution conditions (input parameters)) as the result data 410 in the result database 41. In this way, histories of numerical computation library execution are accumulated in the result database 41 for utilization in calculating the tuning parameters TUNE.

<Details of the Policy Manager and Related Files>

In the present embodiment, the library repository 50 stores solvers 51 as libraries, and the policy definition part 111 reads the one specified by the user out of the plural solvers 51 stored in the library repository 50. As being described later, the policy definition part 111 also reads the objective function 52 from the library repository 50 in accordance with the specification made by the user.

The solvers 51 used as numerical computation libraries are mathematical programming solvers such as eigenvalue equation solvers (hereinafter referred to as the "eigenvalue solvers").

After specifying the solver 51 to be used from the console 6, the user inputs execution conditions, policy parameters, and a tuning parameter TUNE required in executing the solver 51 to the policy definition part 111.

Figure 5:
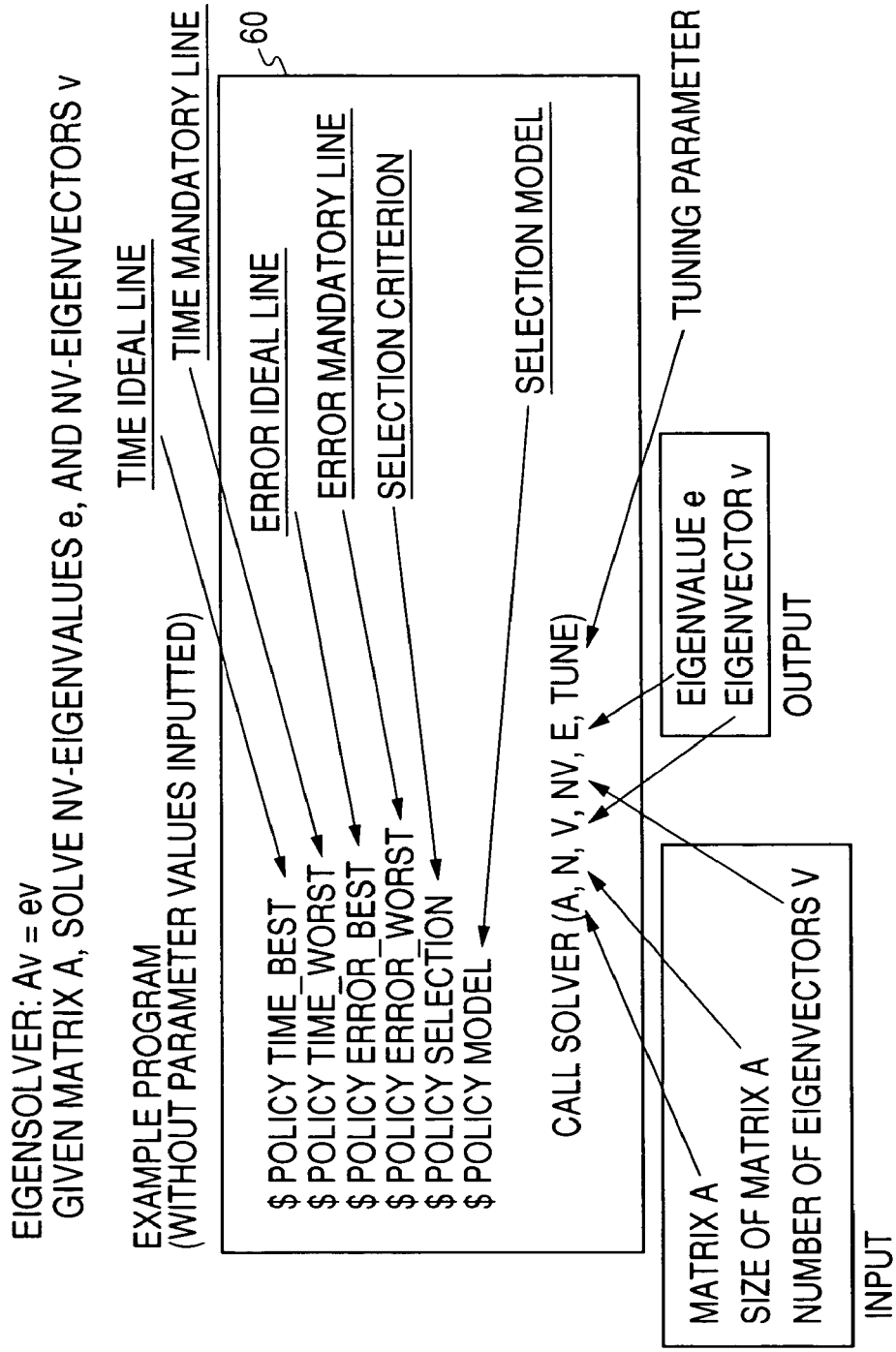
FIG. 5 is a screen image showing an example input screen for setting execution conditions and a tuning parameter.

In cases in which the library to be executed is an eigensolver and in which, with a matrix A given, as many as NV eigenvalues e and as many as NV eigenvectors V are to be solved as shown in FIG. 5 being explained later, the user specifies the name of the library to be executed and then sets the matrix A, the size of the matrix A, and the size and number of eigenvectors V as execution conditions. FIGS. 5 and 6 each show an example screen (user interface) displayed on the display 60 of the console 6.

The results of inputting the execution conditions are described in a CALL statement displayed on the screen as shown in FIG. 6. According to the CALL statement, the solver 51 is inputted as the library name, and matrix name A, matrix size N, number of eigenvectors NV, and eigenvalue E are set respectively.

FIG. 6 shows a user interface outputted to the display 60 of the console 6. A library name 601, input parameters and a tuning parameter TUNE entry field 603 are automatically displayed on the interface as execution conditions.

When executing the solver 51, the user inputs policy parameters, which define what kind of computation is to be made, to the policy definition part 111. As shown in FIG. 5, the policy parameters comprise two kinds of mutually opposing policy parameters such as computation time (speed performance) parameters and computational error (computational accuracy) parameters. Namely, as shown in FIG. 6, a minimum computation time desired by the user (ideal time) is represented by the time ideal line TIME_BEST, and a maximum computation time tolerable by the user (mandatory time) is represented by the time mandatory line TIME_WORST. Furthermore, a minimum computational error desired by the user (ideal error) is represented by the error ideal line ERROR_BEST, and a maximum computational error tolerable by the user (mandatory error) is represented by the error mandatory line ERROR_WORST. These policy parameters are to be respectively entered in the input fields shown on the display 60. A selection criterion SELECTION to be applied in calculating a tuning parameter TUNE based on the policy parameters is also required to be entered.

In calculating a tuning parameter TUNE, the selection criterion SELECTION is used to determine a preferential one of mutually opposing policy parameters. In concrete terms, one of the policy parameters "MODEL", "TIME", and "ERROR" can be selected as the selection criterion SELECTION. The "MODEL" is for calculating the tuning parameter TUNE using the objective function 52. The "TIME" is for determining the tuning parameter TUNE only for time-related policy parameters. The "ERROR" is for determining the tuning parameter TUNE only for error-related policy parameters.

When the "MODEL" is selected as the selection criterion SELECTION, the objective function 52 stored in the library repository 50 is to be entered in the field of selection model name. When, for example, the objective function 52 is set as "min (TIME/TIME_BEST+ERROR/ERROR_BEST)" as shown in FIG. 6, the policy preprocessor 110 is made, as being described later, to calculate the tuning parameter TUNE using the objective function 52 for minimizing the computation time and computational error.

The above objective function 52 is one preset to evaluate plural mutually opposing computational performances. As described above, it obtains a solution (tuning parameter TUNE) for minimizing the computation time (TIME) representing speed performance and the computational error (ERROR) representing computational accuracy.

When executing the solver 51, the policy definition part 111 receives a tuning parameter TUNE item for optimizing the values of time and error which constitute two mutually opposing policy parameters. The tuning parameter TUNE item is selected by the user from those included in the result data 410. The user enters the tuning parameter TUNE item from the console 6. In the present embodiment, as described above, computational accuracy (computational error) is specified as the tuning parameter TUNE. Based on the specification, the policy preprocessor 110 determines computational conditions (speed performance and computational accuracy) which optimize the specified tuning parameter TUNE. The items that are included in the result data 410 and that can be specified by the user are those which indicate past execution results (execution histories) such as the computational error 419 and the execution time 418 shown in FIG. 7 being described later.

As a result of the inputs made as described above, the execution conditions beginning with the library name SOLVER, and the policy parameters comprising a time ideal line TIME_BEST=10 sec, a time mandatory line TIME_WORST=40 sec, an error ideal line ERROR_BEST=$10^{-9}$, and an error mandatory line ERROR_WORST=$10^{-5}$ have been entered as shown in FIG. 6. Furthermore, "MODEL" has been selected as the section criterion SELECTION, in accordance with which the objective function 52 is entered.

The policy definition part 111 receives the execution conditions, policy parameters, and tuning parameter TUNE, and delivers them to the policy preprocessor 110. The policy definition part 111 also generates the source program 90 in which the solver 51 read in by the policy definition part 111 is described in accordance with the execution conditions that have been inputted.

The source program 90 is a source file including a library call part 91 composed of description specifying one of the solvers 51 stored in the library repository 50, a parameter part 92 specifying execution conditions for the specified solver 51, and a result output part 93 composed of description for outputting results of executing the solver 51 to a prescribed result database 41.

The compiler 11 that is activated by the policy preprocessor 110 generates the object 12, which is a file in executable form, based on the source program 90 outputted by the policy definition part 111.

The object 12 generated by the compiler 11 is an executable file including a solver 121 which executes numerical computation, a result output part 122 which outputs results of executing the object 12 to the result database 41 as the result data 410, and a tuning parameter receiving part 123 which receives a tuning parameter TUNE selected by the user and makes it an execution parameter for the solver 121.

The result database 41 in which histories of executing the object 12 are accumulated includes, as shown in FIG. 7, plural result data 410 corresponding to as many solvers 51.

In FIG. 7 showing the result data 410, the information (record) in each of the horizontal rows constitutes history data resulting from one execution of the object 12. The information in each of the horizontal rows includes an execution ID 411 set for one of the solvers 51 on a one-to-one basis, a date and time 412 of execution of the object 12, a name 413 of the library repository 50 to which the solver 51 belongs, a dimension (matrix size) N set by a parameter, a number 415 of eigenvalues e also set by a parameter, a number NV 416 of eigenvectors V also set by a parameter, a tuning parameter 417 selected by the user out of those outputted by the policy manager 10, the execution time 418 taken to execute the object 12, and the computational error 419 of the resultantly obtained eigenvalue e. The execution ID 411 can be determined, for example, by the DBMS 40.

Next, the policy preprocessor 110 calculates, based on the execution conditions, policy parameters and tuning parameter TUNE received by the policy definition part 111, an optimum tuning parameter TUNE by referring to the result database 41 for the selected solver 51 and based on the inputted selection criterion.

The policy preprocessor 110, as shown in FIG. 2, refers to the result database 41 based on the library name SOLVER for the solver 51, reads the records with the same library name, and extracts the records with the same execution conditions.

For example, in cases where the library name is SOLVER, the matrix size N is 1000, and the number NV of eigenvectors is 1000, out of the result data 410 shown in FIG. 7, the four records with execution IDs DL02021, DL02022, DL02023, and HL02011 are extracted as records with matching execution conditions N, NE, and NV.

Figure 3:
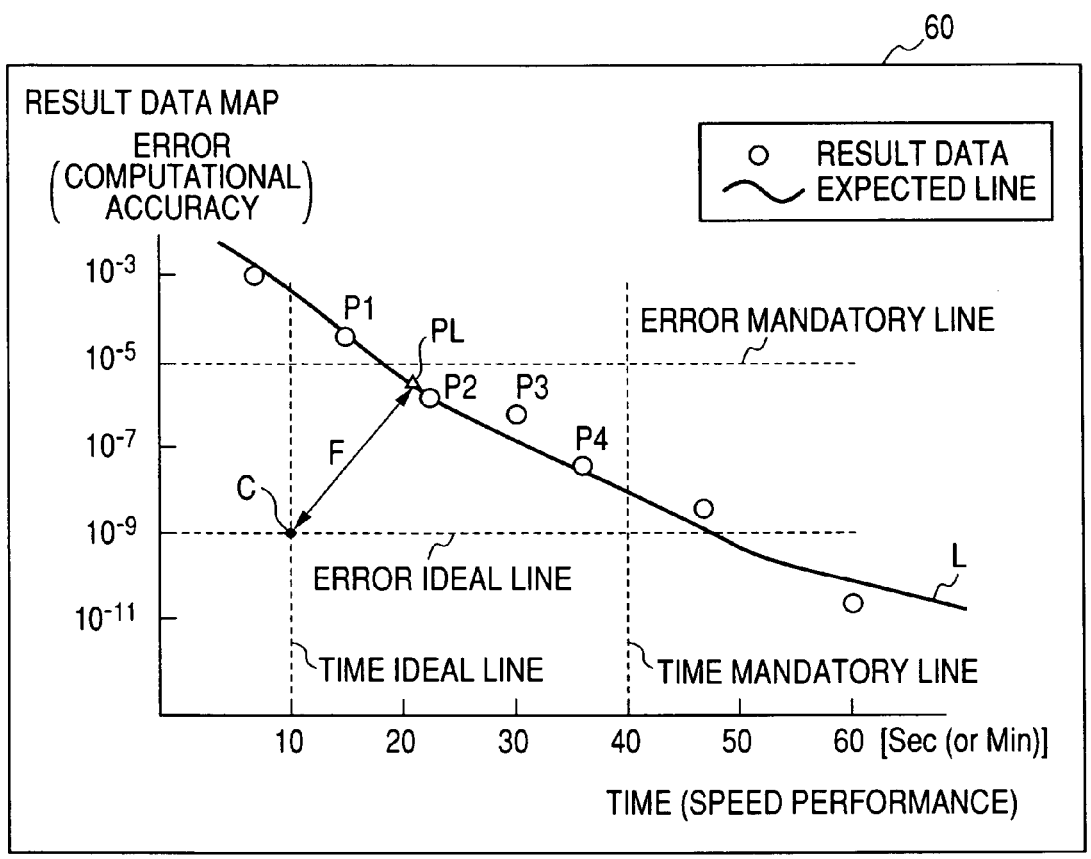
FIG. 3 shows an example graph for obtaining an optimum tuning parameter. The graph shows relationship between speed performance and computational accuracy.

A pair of the execution time 418 and computational error 419 included in the result data 410 determine an exploited point. FIG. 3 shows a graph plotted based on four exploited points P1 to P4 determined based on the above four records with the horizontal axis of the graph representing speed performance and the vertical axis representing computational error, i.e. computational accuracy.

Next, of the exploited points P1 to P4 with the matching execution conditions, those falling in a domain surrounded by the four lines inputted as policy parameters as shown in FIG. 6 are extracted, the four lines being the time ideal line TIME_BEST=10 sec, time mandatory line TIME_WORST=40 sec, error ideal line ERROR_BEST=$10^{-9}$, and error mandatory line ERROR_WORST=$10^{-5}$. In the present example, the exploited points P2 to P4 fall in the above domain, and they are referred to as exploited points in domain.

Next, the policy preprocessor 110 extracts the exploited point in domain at which the objective function 52 (minimum computation time and computational error) set by the selection criterion SELECTION as shown in FIG. 6 is minimum. In the present case as shown in FIG. 3, the exploited point P2 is selected. In the result data 410 shown in FIG. 7, the data in the second row corresponds to the exploited point P2. From the data, it is known that: the computational error was $3.201 \times 10^{-6}$, the execution time (computation time) was 23.5 sec, and the tuning parameter TUNE was $1.0 \times 10^{-6}$.

The policy preprocessor 110 obtains the tuning parameter 417 of the exploited point P2 from the result data 410 and selects the value ($1.0 \times 10^{-6}$ as shown in FIG. 7) of the tuning parameter 417 as the tuning parameter TUNE for the object 12 to be executed. The result data 410 shown in the second row in FIG. 7 indicates that providing the tuning parameter TUNE of $1.0 \times 10^{-6}$ resulted in the computational error of $3.201 \times 10^{-6}$. The tuning parameter TUNE is a computation result indicator. Namely, in the present case, it indicates that the computational error is on the order of $1.0 \times 10^{-6}$.

If, in the above case, "ERROR" is selected as the selection criterion SELECTION, the policy preprocessor 110 selects the exploited point P4 at which, compared with the other exploited points in the domain defined by the policy parameters, the computational error is minimum. Similarly, if "TIME" is selected as the selection criterion SELECTION, the policy preprocessor 110 selects the exploited point P2 at which, compared with the other exploited points in the domain defined by the policy parameters, the computation time is minimum.

The policy preprocessor 110 delivers the extracted result data 410 and tuning parameter TUNE to the candidate parameter output part 112.

Figure 4:
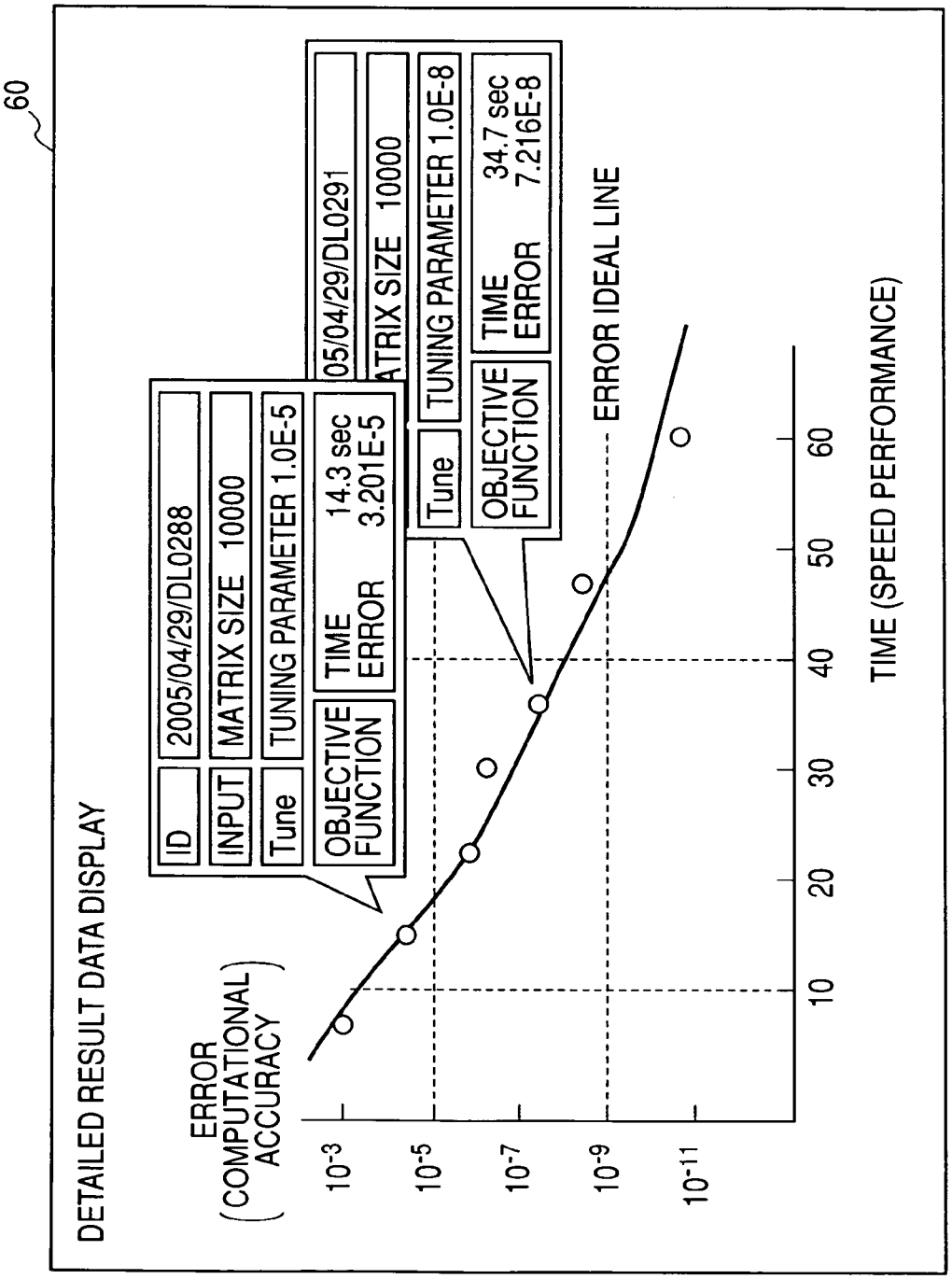
FIG. 4 shows an example graph for obtaining an optimum tuning parameter. The graph shows detailed execution conditions based on relationship between speed performance and computational accuracy.

The candidate parameter output part 112 outputs the screen image shown in FIG. 3 to the display 60 of the console 6 thereby allowing the user to obtain the optimum tuning parameter TUNE. At this time, the exploited point P2 providing the optimum tuning parameter TUNE may be made to blink or displayed in a different color from the other exploited points. When using the tuning parameter TUNE thus outputted as it is, the user may order the policy manager 10 to execute the object 12, for example, by pressing the enter key on the keyboard of the input device 61. In cases where the user wants to use a different exploited point, the user may select a desired exploited point using the input device 61, which may be a mouse, and then order execution of the object 12. As shown in FIG. 4, in addition to displaying the tuning parameter TUNE on the console 6, the result data 410 corresponding to the tuning parameter TUNE may also be displayed.

The candidate parameter output part 112, in accordance with an order of the user, executes the solver 51 (121) while controlling the computation made by the object 12 based on the selected tuning parameter TUNE. When the execution of the object 12 completes, the history data on the just completed execution is, as described above, written in the result database 41 thereby terminating the processing.

In the candidate parameter output part 112, when a desired exploited point is specified by the user using the input device 61 that may be a mouse, the detailed result data 410 on the exploited point can be displayed as shown in FIG. 4. This allows the user to obtain concrete history information about the solver 51 to be executed.

When a numerical computation library such as one for mathematical programming is used, exploited points vary with input data. Therefore, matching execution conditions do not necessarily result in similar computation times and computational accuracies. When, with respect to the solver 51 selected by the user, detailed information about an arbitrarily selected exploited point can be displayed, it is possible to correct the tuning parameter TUNE according to the characteristics of the solver 51 to be executed. When correcting the tuning parameter TUNE, it is desirable to change the conditions for determining exploited points and cancel the domain defined by the policy parameters.

An arrangement may also be made such that the detailed result data 410 as shown in FIG. 4 is displayed only for the exploited points in domain, that is, the exploited points falling in the domain defined by the policy parameters. When such an arrangement is made, the detailed result data 410 about exploited points outside the domain defined by the policy parameters is not displayed, so that the user can set the tuning parameter TUNE based on exploited points which comply with the policy parameters set by the user.

<Details of the Processing Procedure>

Next, the processing performed by the policy manager 10 will be described with reference to the PAD (problem analysis diagram) shown in FIG. 8.

First, in S1, a library comprising a solver 51 is specified as a numerical computation library to be used, and execution conditions and a tuning parameter TUNE are set for the selected solver 51.

Namely, in S11, execution conditions such as the library name SOLVER, matrix name A, matrix size N, number NV of eigenvectors, and eigenvalue E as shown in FIG. 6 are set. In the description of S11 in FIG. 8, the original program represents the selected solver 51 and the input parameters represent the execution conditions. In S12, an item of the result data 410 to which the tuning parameter TUNE for the solver 51 corresponds is specified. In the present embodiment, the tuning parameter TUNE corresponds, as described above, to the computational error 419.

Next, in S2, a policy for the selected solver 51 is set. Namely, the policy parameters as shown in FIG. 6 are set (S20). In more concrete terms, the time ideal line TIME_BEST, time mandatory line TIME_WORST, error ideal line ERROR_BEST, error mandatory line ERROR_WORST, and also the selection criterion SELECTION to be applied when calculating the tuning parameter TUNE based on the policy parameters are inputted (S21 to S25). At this time, if the selection criterion SELECTION is "MODEL", the objective function 52 is read from the library repository 50 based on the user's specification (for example, min (f) in FIG. 6).

When inputting of the policy parameters completes, the policy manager 10 generates, in S3, the source program 90 based on the solver 51 and execution conditions such as the matrix name and matrix size, and stores it as a source file in the storage device 5 or in the memory 3.

After generating the source program 90, the policy manager 10 transfers control from the policy definition part 111 to the policy preprocessor 110, orders the compiler 11 to compile the source program 90 (S4), and obtains the optimum tuning parameter TUNE (S5). Thus, calculation of the tuning parameter TUNE and compilation of the source program 90 are carried out concurrently.

To determine the tuning parameter TUNE, first, in S50, the result database 41 is, as described above, searched for execution histories of the selected solver 51. Next, in S51, exploited points falling in the domain defined by the policy parameters are extracted as shown in FIG. 3 from the result data 410 with matching execution conditions. Out of the exploited points, one satisfying the MODEL specified by the selection criterion SELECTION is determined.

Figure 9:
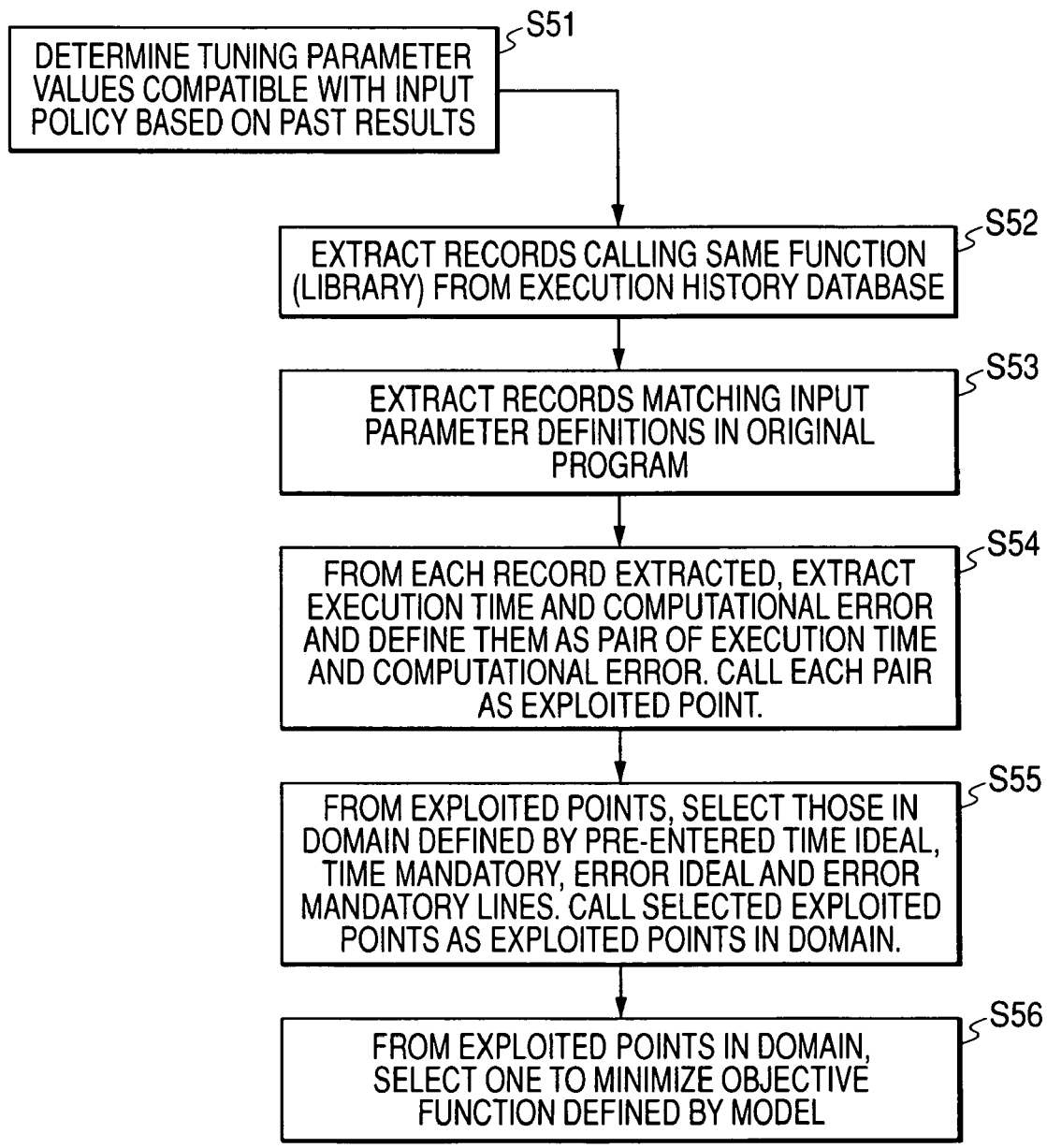
FIG. 9 is a PAD showing an example of processing performed in S51 shown in FIG. 9.

The subroutine shown in FIG. 9 describes in detail the operation performed in S51.

In S52, the result data 410 using the same solver 51 are extracted from the result database 41. In S53, out of the records extracted in S52, those with execution conditions matching preset conditions (for example, matrix size N) are extracted. Next, in S54, plural exploited points, each defined by a pair of computational error and computation time of a record extracted in S53, are selected from the corresponding result data 410.

In S55, out of the exploited points extracted in S54, those with a computation time in the range between the time ideal line TIME_BEST and the time mandatory line TIME_WORST and a computational error in the range between the error ideal line ERROR_BEST and the error mandatory line ERROR_WORST are selected as exploited points in domain. The result data 410 of the exploited points constitute the data 410 satisfying the policy set by the user.

In S56, based on the model set in advance in the objective function 52 selected by the selection criterion SELECTION, an exploited point in domain which minimizes the objective function 52 is selected. The value of the tuning parameter TUNE included in the result data 410 of the exploited point in domain thus selected is determined to be the optimum tuning parameter TUNE.

Figure 8:
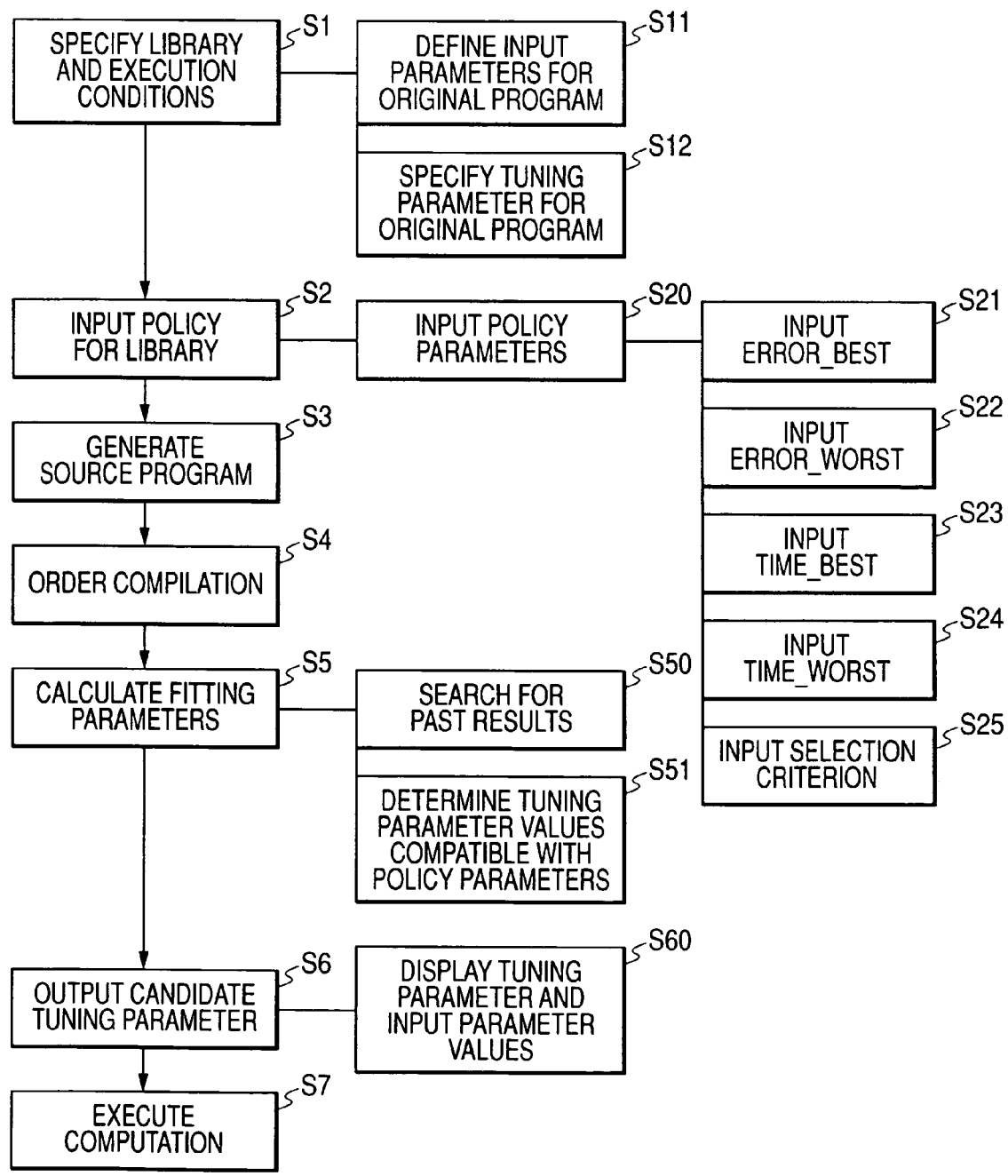
FIG. 8 is a PAD showing an example of processing performed by the policy manager.

Reverting to FIG. 8, in S6, the exploited point determined in S51 as a candidate tuning parameter TUNE is outputted to the display 60. In S60, as shown in FIG. 4, detailed history information about each exploited point is outputted as required.

In S7, the object 12 is activated using the tuning parameter TUNE selected by the user. As described above, by controlling the operation of the solver 51 (121) using the tuning parameter TUNE, the numerical computation library can be executed in accordance with the computation time and computational accuracy desired by the user. It is after the compiler 11 completes generation of the object 12 that the policy manager 10 activates the object 12 in S7.

As described above, according to the present invention, exploited points are selected from the result database 41 based on a user policy, and an optimum tuning parameter TUNE is outputted out of the selected exploited points.

Therefore, when the user specifies an error range for numerical computation and a computation time range, the policy manager 10 can obtain an optimum tuning parameter TUNE from the history data on past executions of numerical computation (solver 51). Therefore, the numerical computation library can be tuned extremely easily without requiring the user to adjust plural parameters.

Second Embodiment

Figure 10:
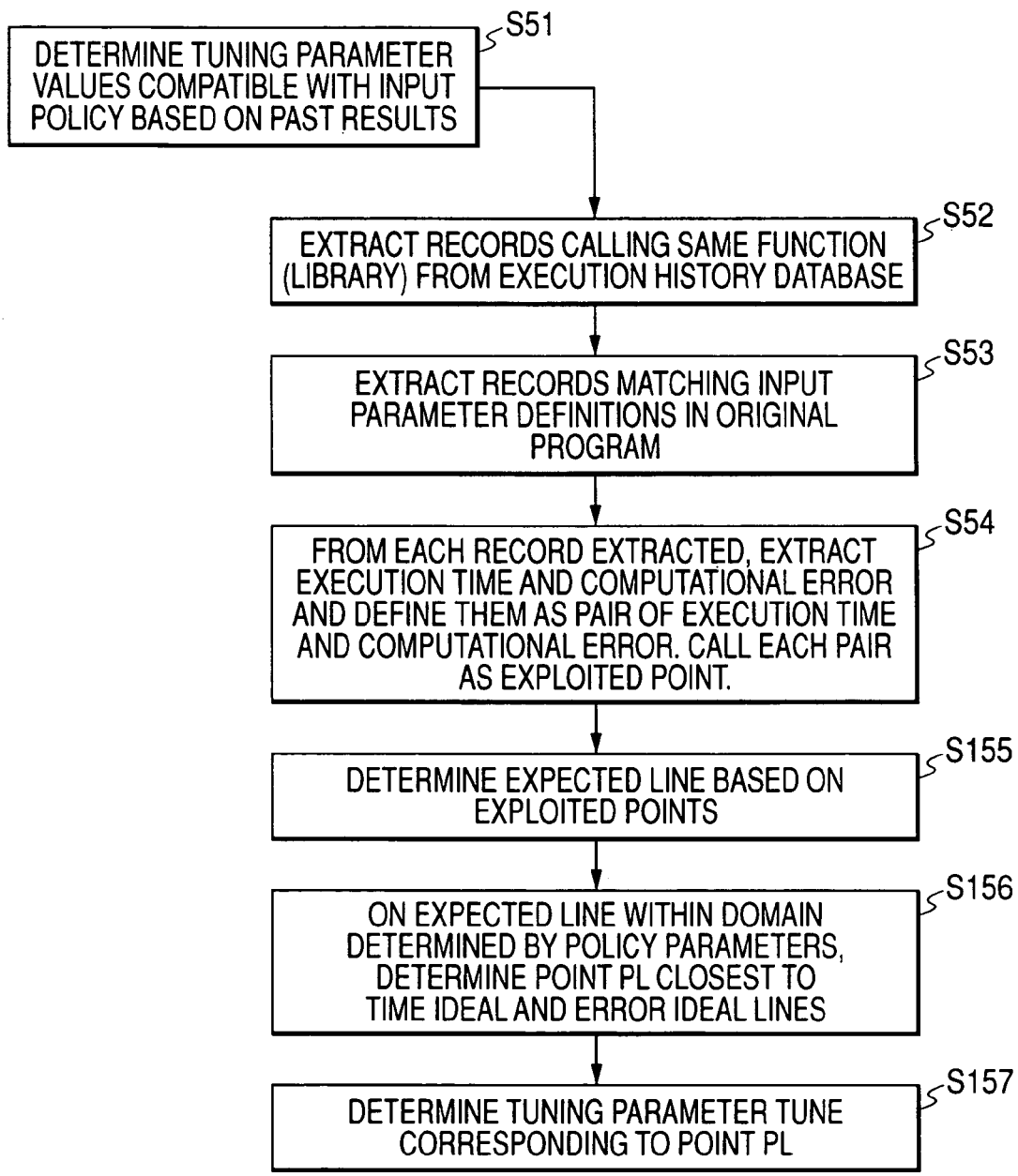
FIG. 10 is a PAD showing an example of processing performed in S51 shown in FIG. 9 according to a second embodiment.

FIG. 10 shows a second embodiment. In the second embodiment, the operation to determine an optimum tuning parameter TUNE as shown in FIG. 9 for the first embodiment is performed after an expected line L is set in a two-dimensional coordinate space with a horizontal axis representing speed performance and a vertical axis representing computational error as shown in FIG. 3. In other respects, the second embodiment is the same as the first embodiment.

S51 to S54 of the second embodiment are the same as those of the first embodiment. Namely, exploited points with matching execution conditions for the same solver 51 are selected in S51 to S54.

In S155, the expected line (error ideal line) L as shown in FIG. 3 is determined based on the execution time and computational error at each exploited point. To determine the expected line L (execution history characteristic), a known method such as a linear approximation method may be used.

In S156, a point PL on the expected line L within the domain defined by the policy parameters is determined, the point PL being where the distance F between the expected line L and the intersection C of the time ideal line TIME_BEST and the error ideal line ERROR_BEST shown in FIG. 3 is minimum. The point PL can be determined, for example, by sampling points on the expected line L at prescribed intervals in the time axis direction and selecting, out of the sampled points, the one closest to the intersection C.

In S157, the tuning parameter TUNE corresponding to the point PL is selected as an optimum value. The tuning parameter corresponding to the point PL can be determined by linear approximation based on the values of the tuning parameters TUNE for exploited points.

The above processing, like in the case of the first embodiment, also makes it possible to determine an optimum tuning parameter TUNE.

Third Embodiment

Figure 11:
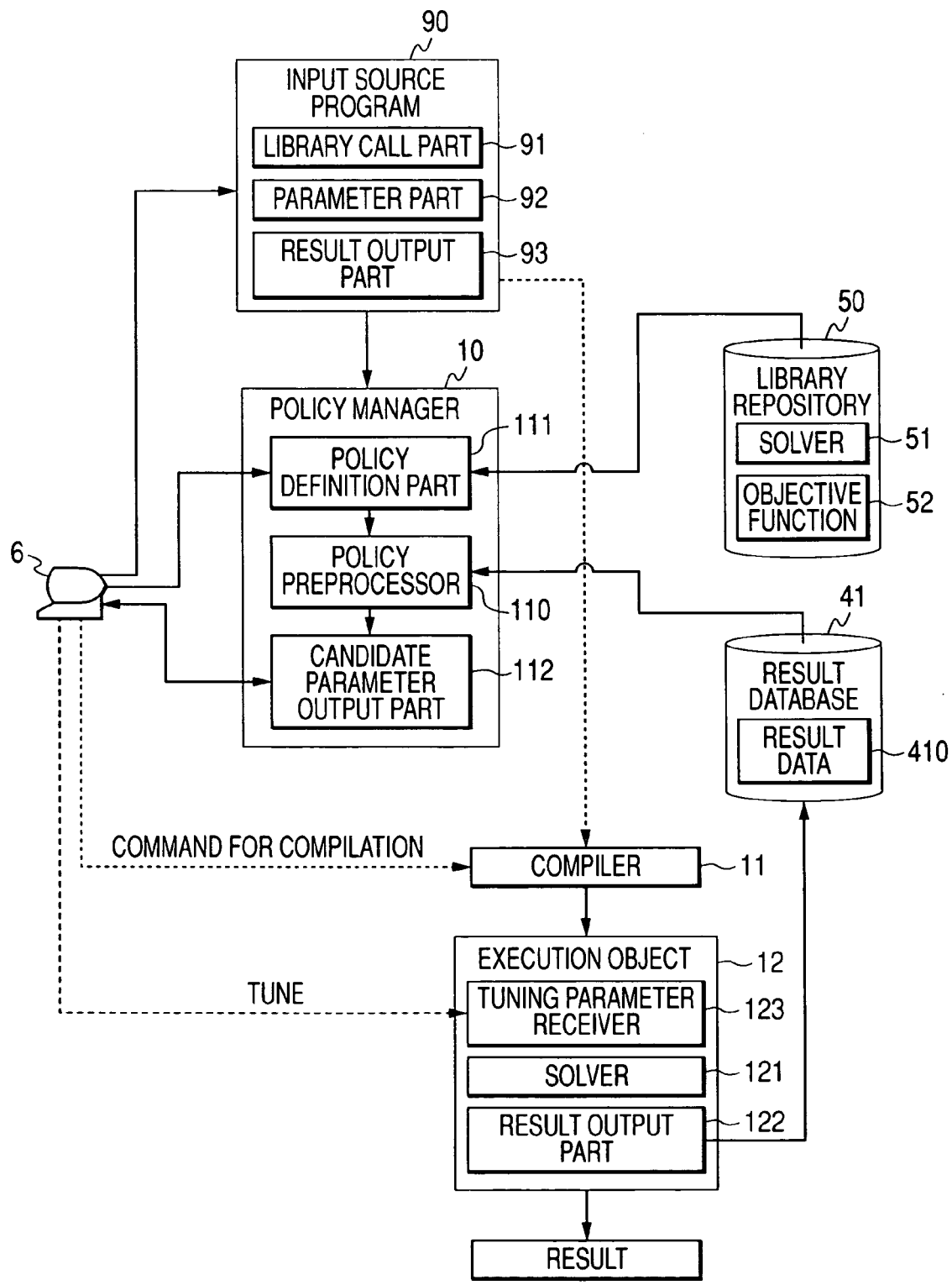
FIG. 11 is a block diagram of software configuration centering around a policy manager according to a third embodiment.
Figure 12:
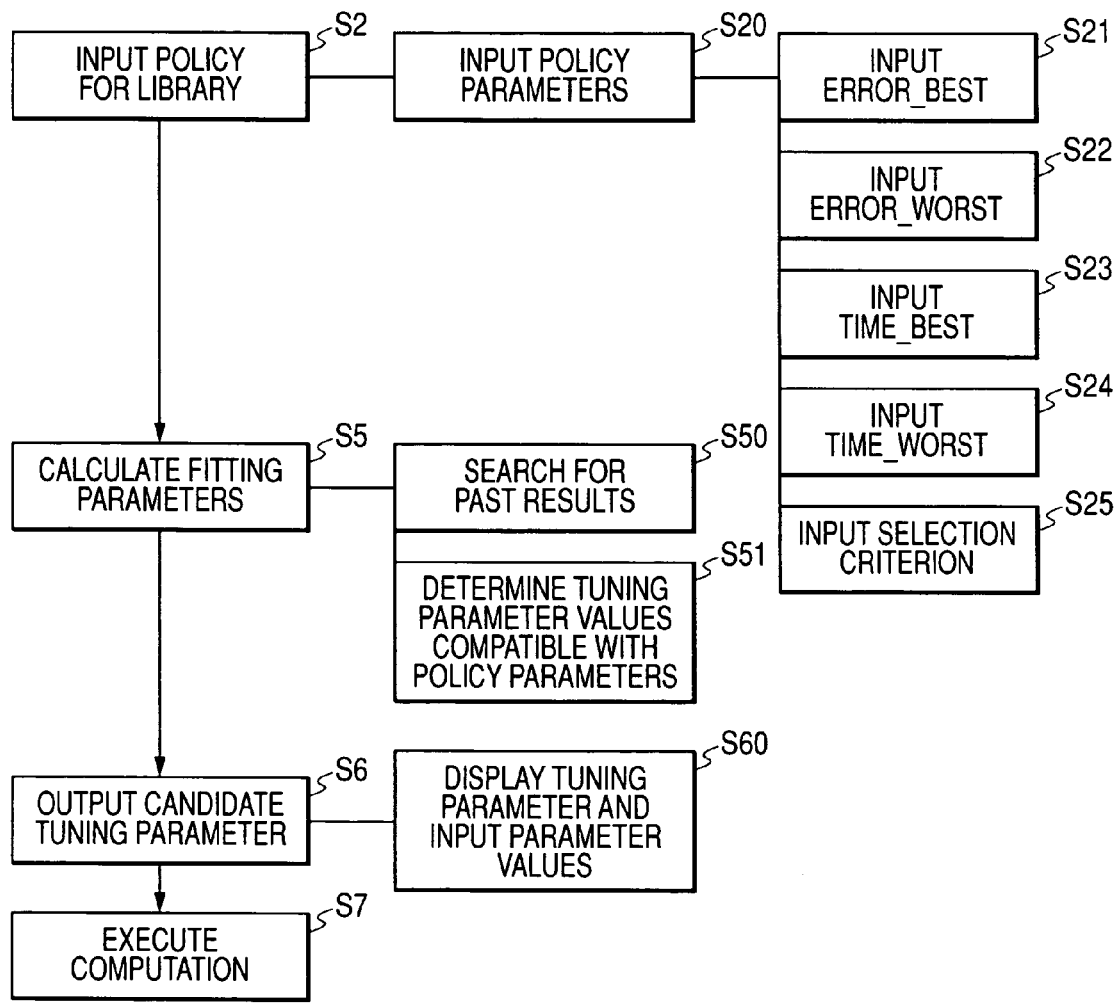
FIG. 12 is a PAD showing an example of processing performed by the policy manager according to the third embodiment.

FIGS. 11 and 12 show a third embodiment. In the third embodiment, the policy manager 10 as used in the first embodiment is arranged such that it reads a source program 90 generated in advance and such that it outputs an optimum tuning parameter TUNE to the console 6. The compiler 11 and the object 12 are activated when ordered by the user from the console 6. In other respects, the configuration of the third embodiment is the same as that of the first embodiment. Namely, the third embodiment shown in FIGS. 11 and 12 has only the second function out of the foregoing three functions described for the first embodiment.

The policy definition part 111 reads the source program 90, in which the solver 51 and execution conditions (input parameters) have been described, and sets policy parameters (S2 to S25 in FIG. 12). The processing of the third embodiment is equivalent to the processing of the first embodiment shown in FIG. 8 less S1, S11, S12, S3, S4, and S7. Namely, what is done in the third embodiment is only to determine an optimum tuning parameter TUNE for the source program 90.

Referring to FIG. 11, the user of the user computer 1 provides the policy manager 10 with policy parameters and obtains an optimum tuning parameter TUNE.

In the above process, the user can have the operation for determining an optimum tuning parameter TUNE executed repeatedly until a desired value is obtained.

When a desired value of the tuning parameter TUNE is obtained, the user can enter a command for source program compilation from the console 6. When the object 12 is generated, the user can set the optimum value of the tuning parameter TUNE obtained from the policy manager 10 as an option for the object 12 and execute the object 12.

As described above, obtaining an optimum tuning parameter TUNE is also possible by using the policy manager 10 alone.

Fourth Embodiment

Figure 13:
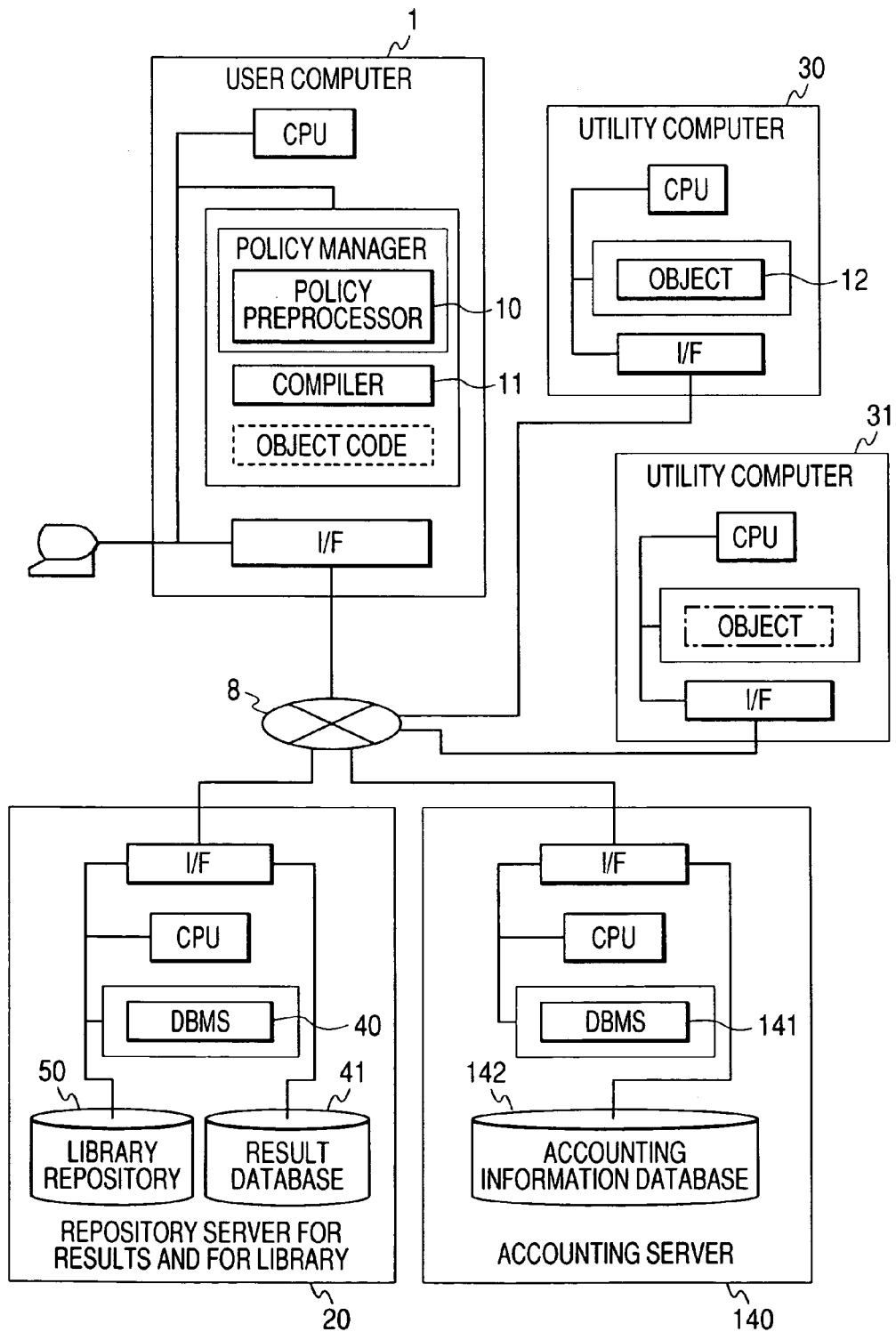
FIG. 13 is a block diagram of a computer system according to a fourth embodiment.

FIG. 13 shows a fourth embodiment. In the fourth embodiment, the network 8 as used in the first embodiment is further connected with plural utility computers 30 and 31 which undertake operation requested by the user computer 1, and an accounting server 140 which manages accounting information for the user computer 1 having used the utility computer 30 or 31. The user computer 1 asks either of the utility computers 30 and 31 to execute the object 12 generated by the compiler 11. The user computer 1 and the server for results and for library 20 are configured to be the same as in the first embodiment.

The utility computer 30 or 31 executes the object 12 in accordance with a request received from the user computer 1 and returns the results of execution to the user computer 1. The utility computer 30 or 31 then sends accounting information generated as a result of executing the object 12 for the user computer 1 to the accounting server 140.

The accounting server 140 executes an accounting information database 142 being managed by a DBMS 141. The accounting information database 142 stores usage fee information on each of the utility computers 30 and 31 and accounting information for each of the user computers 1.

The policy manager 10 of the user computer 1 can specify usage fee information as a policy parameter. When, for example, a minimum usage fee is represented by "COST_BEST" and a maximum usage fee is represented by "COST_WORST", the objective function 52 shown in FIG. 6 can be described as follows:

min(TIME/TIME_BEST+ERROR/ERROR_BEST+COST/COST_BEST)

Thus, it is possible to select a tuning parameter TUNE which minimizes the execution time, computational error and usage fee (COST) when executing the solver 51 selected. In this case, the graph shown in FIG. 3 becomes three-dimensional. When, in this case, the usage fee differs between the utility computers 30 and 31, it is possible to estimate the usage fee for using each of the utility computers and select the most economical utility computer.

As described above, when using a commercial utility computer, adding usage fee information as a policy parameter enables the user to have the object 12 executed by a utility computer which realizes an optimum tuning parameter TUNE. In this way, an environment for using a computer which is satisfactory in terms of speed performance, computational performance, and also cost performance can be easily obtained.

The objective function 52 can be made, based on its two-dimensional configuration incorporating speed performance and computational accuracy, multi-dimensional by adding usage fee information as mentioned above and other information, for example, resource allocation information (such as the number of CPU cores and memory capacity) on the computer to execute computation. In this case, the policy parameters also become multi-dimensional. For example, a minimum number required of CPU cores and an ideal number of CPU cores may be added as policy parameters. Furthermore, a minimum memory capacity required and an ideal memory capacity can also be added as policy parameters.

In the first to the fourth embodiments, an arrangement may be made such that, when an optimum tuning parameter TUNE cannot be obtained in the domain defined by the policy parameters set by the user, a warning message is displayed on the console 6.

Even though the policy manager 10 and the compiler 11 used in the first to the fourth embodiments have been described as independent software modules, the policy manager 10 of the present invention may be included in the compiler 11 or in an editor not illustrated in the attached drawings.

As described above, the present invention allows a numerical computation library stored in a library to be tuned easily and appropriately, so that the present invention can be made use of in offering software or a library for numerical computation.

What is claimed is:

1. A computer readable medium having a computer readable program code, said computer readable program code to execute a method for calculating a tuning parameter for a numerical computation library, the computer readable program code being arranged to calculate an optimum tuning parameter, based on a preset objective function, for use in executing the numerical computation library, said method comprising the steps of:
    reading the numerical computation library;
    reading the objective function;
    selecting the tuning parameter;
    setting a user policy as plural policy parameters regarding speed performance and computational accuracy of the numerical computation library;
    reading, from preset execution histories of numerical computation libraries, execution histories of the numerical computation library;
    determining exploited points, each exploited point is defined by a pair of speed performance and computational accuracy of a record based on the execution histories having been read in;
    calculating the optimum tuning parameter for the numerical computation library by using the objective function that optimizes the speed performance and computational accuracy constituting two mutually opposing elements; and
    outputting a calculation result of the objective function,
    wherein the step of setting a user policy as plural policy parameters includes setting a first target policy parameter specifying an ideal value of the speed performance, a first mandatory policy parameter specifying a minimum required value of the speed performance, a second target policy parameter specifying an ideal value of the computational accuracy, and a second mandatory policy parameter specifying a minimum required value of the computational accuracy, and
    wherein, in the step of calculating the optimum tuning parameter, minimizing the objective function selects, from the execution histories, a determined exploited point within a domain defined by the plural policy parameters and a value of the tuning parameter of the selected exploited point is the calculated optimum tuning parameter.

2. The computer readable medium for calculating a tuning parameter for a numerical computation library according to claim 1,
    wherein the step of setting a user policy as plural policy parameters further includes a step of setting correspondence between items included in each of the preset execution histories and corresponding tuning parameters.

3. The computer readable medium for calculating a tuning parameter for a numerical computation library according to claim 1,
    wherein the step of outputting a calculation result of the objective function further includes outputting the optimum tuning parameter and execution histories corresponding to the optimum tuning parameter to a display of a computer.

4. The computer readable medium for calculating a tuning parameter for a numerical computation library according to claim 1:
    wherein, in the step of calculating the optimum tuning parameter, alternatively, based on speed performance and computational error values included in the execution histories, a characteristic of the execution histories is determined on two-dimensional coordinates representing the speed performance and computational accuracy, a point on the characteristic where a distance between an intersection of the first target policy parameter and the second target policy parameter and the characteristic is a minimum is calculated, and the tuning parameter corresponding to the calculated point and determined by linear approximation based on the values of the tuning parameters for exploited points is selected as the optimum tuning parameter.

5. The computer readable medium for calculating a tuning parameter for a numerical computation library according to claim 1:
    wherein the step of reading the numerical computation library includes a step of setting input parameters for the numerical computation library, and
    wherein the step of reading execution histories of the numerical computation library includes extracting and reading, out of the preset execution histories, those with input parameters matching the set input parameters.

6. The computer readable medium for calculating a tuning parameter for a numerical computation library according to claim 1:
    wherein the step of setting a user policy as plural policy parameters further includes setting a third target policy parameter specifying an ideal value of a usage fee for a computer used to execute the numerical computation library.

7. The computer readable medium for calculating a tuning parameter for a numerical computation library according to claim 1:
    wherein the step of setting a user policy as plural policy parameters further includes setting a third mandatory policy parameter specifying a maximum allowable value of a usage fee for a computer used to execute the numerical computation library, and a third target policy parameter specifying an ideal value of the usage fee.

8. The computer readable medium for calculating a tuning parameter for a numerical computation library according to claim 1:
    wherein the step of setting a user policy as plural policy parameters further includes setting a third target policy parameter specifying an ideal value of a computer resource to be used to execute the numerical computation library.

9. The computer readable medium for calculating a tuning parameter for a numerical computation library according to claim 1:
    wherein the step of setting a user policy as plural policy parameters further includes setting a third mandatory policy parameter specifying a minimum allowable value of a computer resource to be used to execute the numerical computation library, and a third target policy parameter specifying an ideal value of the computer resource.

10. The computer readable medium for calculating a tuning parameter for a numerical computation library according to claim 1, wherein the step of setting a user policy as plural policy parameters includes an interface for accepting input of preset policy parameters.

* * * * *